J. F. O'CONNOR.
HAND BRAKE FOR RAILWAY CARS.
APPLICATION FILED MAY 26, 1920.
1,383,333.
Patented July 5, 1921.
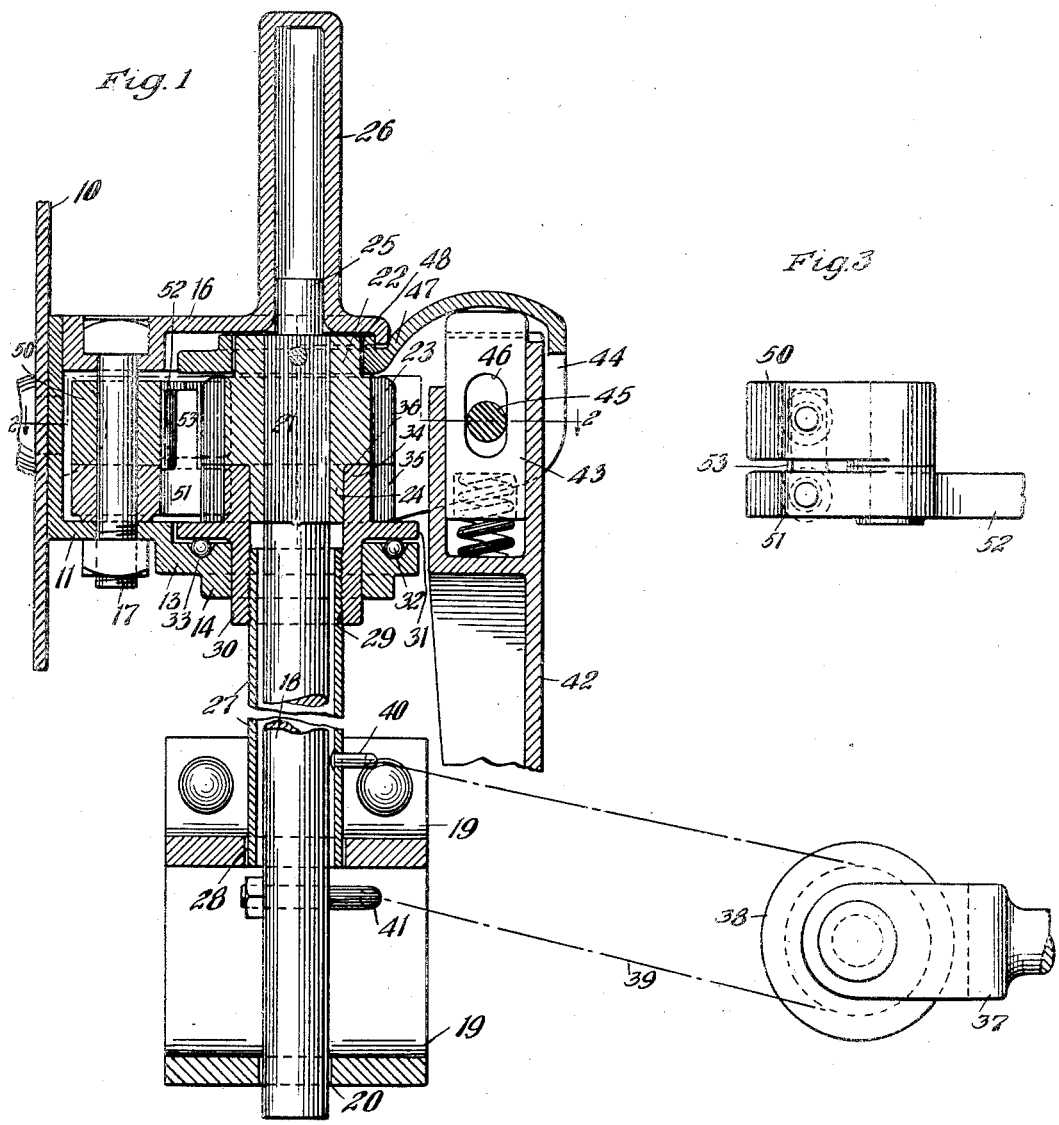
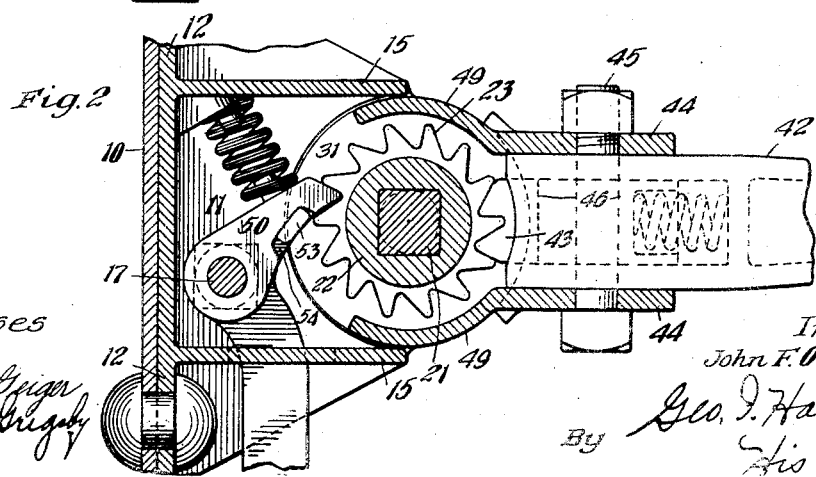
Witnesses
Wm. Geiger
Una C. Grigsby
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND-BRAKE FOR RAILWAY-CARS.

1,383,333.   Specification of Letters Patent.   Patented July 5, 1921.

Application filed May 26, 1920. Serial No. 384,440.

*To all whom it may concern:*

Be it known that I, JOHN F. O'CONNOR, a citizen of United States, residing at Chicago, in the county of Cook and State of Illinois, have invented a certain new and useful Improvement in Hand-Brakes for Railway-Cars, of which the following is a full, clear, concise, and exact description, reference being had to the accompanying drawings, forming a part of this specification.

This invention relates to improvements in hand brakes for railway cars.

The object of the invention is to provide a hand brake especially adapted for railway cars wherein the tension on the brake rigging is applied in a well known manner by means of a pawl and ratcheting mechanism, the brake embodying means for taking up the slack in the brake chain rapidly and thereafter applying the tension to the brake chain more slowly but with a higher leverage ratio, the shift from the high speed low leverage ratio to the slow speed high leverage ratio being accomplished automatically without the necessity of the brakeman operating any special devices or changing his usual method of applying the brake.

In the drawing forming a part of this specification, Figure 1 is a vertical sectional view of a vertical staff type of brake showing my improvements in connection therewith. Parts of the mechanism are broken away in order to better accommodate the figure on the sheet. Fig. 2 is a horizontal sectional view corresponding substantially to the line 2—2 of Fig. 1, the operating lever and pawl in this figure being shown in horizontal operative position. And Fig. 3 is a detail elevational view of the double dog employed in my construction.

In said drawing, 10 denotes a portion of an end wall of a car to which is secured a combined housing and bearing bracket 11, the latter having suitable flanges 12—12 by which it may be riveted or otherwise rigidly secured to the car wall. Said bracket is provided with a horizontally extending lower flange 13 having a relatively heavy boss 14 which is perforated so as to form a bearing. The side walls of the housing for the ratcheting mechanism and associated parts are formed by vertical outwardly extending spaced flanges 15—15 as shown in Fig. 2 and the top of the housing is completed by a cap plate 16 adapted to be secured in place by a bolt and nut 17.

In carrying out my invention, I employ a vertical brake staff or mast 18, the lower end of which is journaled in a stirrup plate 19 as indicated at 20. The upper end of the staff 18 has a squared section 21 on which is rigidly secured a combined bearing hub and ratchet wheel 22, the teeth of the ratchet wheel being indicated at 23 and the bearing hub proper being indicated at 24. Preferably, the extreme upper end of the staff will have a cylindrical section 25 of reduced diameter rotatable in a bearing provided by an upwardly extending grab handle 26 formed integral with the cap plate 16.

Inclosing the staff 18 is what may be termed an auxiliary staff or sleeve of tubular formation indicated at 27, the lower end thereof being journaled in an opening 28 formed in an upper part of the stirrup plate 19. In this connection, it will be understood that the stirrup plate 19 is attached to the end sill or buffer beam of the car so as to bring the lower ends of the sleeve 27 and staff 18 below the floor level of the car in the usual manner. The upper end of the sleeve 27 may be threaded as indicated at 29 so as to have attached thereto a bushing 30 which is journaled in the recess 14 of the bearing bracket. The bushing 30, above the bearing 14, is provided with a laterally extended annular flange 31 which overlies a portion of the flange 13 of the bearing bracket and between said flange 31 and flange 13 are interposed a series of anti-friction bearing balls 32, the latter running in a raceway 33 formed in the flange 13. In this manner, the friction normally tending to resist rotation of the sleeve 27 is reduced to a practical minimum for the purposes hereinafter described.

Above the level of the flange 31, the bushing 30 is provided with an interior journal bearing 34 for the hub proper 24 so that the latter may rotate therein under certain conditions as hereinafter described. Said upper portion of the bushing 30 is also provided with a series of ratchet teeth 35, the same having a pitch diameter corresponding to the pitch diameter of the ratchet teeth 23. It will be noted also that a supporting shoulder or ledge 36 is formed on the upper face of the bushing 30 to sustain the weight of the ratchet wheel 22 and staff 18 to which it is rigidly attached.

A portion of a brake rod of the brake rigging is indicated at 37, the same being forked and carrying a sheave wheel 38 over which extends a chain or equivalent flexible connection 39. One end of said chain 39 is attached to the sleeve 27 as indicated at 40 and the opposite end is attached to the staff 18 as indicated at 41. With this construction, upon simultaneous rotation of the staff 18 and sleeve 27, as hereinafter described, it is evident that the chain 39 will be taken up very rapidly since it will be winding about two members or, in effect, winding drums, the diameter of the sleeve 27 being appreciably larger than the diameter of the staff 18 so that the take-up for that corresponding end of the chain 39 will be unusually rapid.

To effect the application of the brake, I preferably employ a gravity controlled pivoted drop handle 42 which carries a spring controlled sliding pawl 43 at its upper end. Said operating lever or handle 42 is pivotally attached to a carrier 44 by means of a bolt 45. In actual practice, the bolt 45 will pass through an elongated slot 46 in the pawl 43 so as to prevent the latter from coming out of its corresponding socket or guideway in the lever handle 42 while at the same time permitting its necessary reciprocation back and forth therein. The carrier 44 has a top flange 47 which fits under the cap plate 16 and which is journaled as indicated at 48 on the upper part of the ratchet wheel 22. Said carrier 44 preferably also has depending side flanges 49—49 encircling the two sets of ratchet teeth 23 and 35 so as to complete the housing for the mechanism and protect it from the weather. As will be understood by those skilled in the art, the operating lever 42 which carries the pawl 43 will normally hang in a depending vertical position with the pawl disengaged from the ratchet teeth 23 and when it is desired to operate the brake, the brakeman will elevate the lever 42 to a horizontal position as indicated in Fig. 2 and then proceed to oscillate it back and forth with the pawl 43 in engagement with the ratchet teeth 23 so as to effect step by step rotation of the staff 18 in a winding direction.

To prevent unintentional reverse rotation of the staff 18, that is, in an unwinding direction, I provide a spring controlled pivoted dog 50 which is pivoted on the bolt 17 and arranged to coöperate with the ratchet teeth 23.

To prevent unintentional reverse rotation of the sleeve 27, I provide a second independently spring controlled pivoted dog 51, also mounted on the bolt 17 below the dog 50 and which is arranged to coöperate with the ratchet teeth 35. The dog 51 is provided also with a laterally extended release handle or lever 52 so as to permit of manual disengagement of the dog 51 from the teeth 35. It will also be noted from an inspection of Figs. 2 and 3, that the dog 51 is provided with an upwardly extending arm or lug 53 which extends within the corresponding slot 54 formed in the dog 50 so that, when the dog 51 is released, the upper dog 50 will also be simultaneously released from the ratchet teeth 23. With the construction described, it will be observed that the upper dog 50 is adapted for outward movement, that is, to slip over the ratchet teeth 23, independently of and without affecting the dog 51.

The operation is as follows. When the brakeman starts to apply the brake, he first elevates the lever 42 and proceeds to oscillate it in a horizontal plane which will cause rotation of the upper ratchet wheel in a direction to wind one end of the chain 39 around the staff 18. Due to the fact that the weight of the staff 18 is sustained on the bushing 30 the latter together with the sleeve 27 will rotate in unison with the staff due to the friction where the weight of the one is transferred to the other and because of the reduced friction between the flange 31 carried by the sleeve and the bracket. This will obviously effect a winding of the upper end of the chain 39 about the sleeve 27 and the lower end about the staff 18, and the action described will continue during the taking up of the slack in the chain and until such time as the tension exerted on the chain will be sufficient to overcome the friction between the sleeve bushing 30 and the staff ratchet wheel 22. As the brakeman continues his ratcheting action, the sleeve 27 will be held against reverse rotation on account of the dog 51 and hence the corresponding end of the chain 39 will be held fixed. The staff 18, however, will continue to be rotated thereby continuing the winding of the corresponding end of the chain 39 about the staff 18 and very much multiplying the effective leverage ratio that is ultimately transformed into a pull on the brake rod 37. Reverse rotation of the staff 18 is prevented by the dog 50, as heretofore described. To release the brake entirely, the operator merely actuates the dog lever 52 which will release both the sleeve and the staff simultaneously and thereby permit complete unwinding of both ends of the chain 39 from the sleeve 27 and staff 18, respectively. This latter is of importance since it overcomes all possibility of one end of the chain being gradually taken up and wound unevenly on either the sleeve or staff.

From the preceding description, it will be seen that the brakeman applies the brake throughout the entire operation in a well known manner and he is not required to operate any separate devices or give any thought thereto when the change from the high speed low leverage ratio to the slow speed, high leverage ratio is automatically effected. The brake is furthermore positive in its action and affords a practical solution for a long desired brake which will quickly take up slack and yet provide the necessary final leverage ratio in putting on the brakes.

Although I have herein shown and described what I now consider the preferred manner of carrying out the invention, the same is merely illustrative and I contemplate all changes and modifications that come within the scope of the claims appended hereto.

I claim:

1. In a hand brake adapted for railway cars, the combination with a rotatable staff; of a concentric rotatable sleeve, said staff and sleeve being each adapted to have one end of a common flexible connection attached thereto and wound therearound, said staff being supported from said sleeve; a pawl and ratchet mechanism for effecting rotation of the staff directly and of the sleeve indirectly by reason of the friction arising from the staff being supported by the sleeve until the tension of said flexible connection on the sleeve overbalances the effect of the friction between the sleeve and staff; and independently acting devices for preventing rotation of the staff and sleeve in an unwinding direction.

2. In a hand brake for railway cars and the like, the combination with a bracket adapted to be secured to a wall of a car; of a sleeve rotatably mounted within and supported from said bracket and to which one end of a flexible connection is adapted to be attached and wound therearound; a rotatable staff in frictional contact with said sleeve and to which the other end of said flexible connection is adapted to be attached and wound therearound; means for rotating the staff directly in a direction to wind the flexible connection therearound, said sleeve being rotated in unison with the staff under the frictional contact therewith until the tension of said flexible connection overcomes said friction; releasable means to prevent rotation of said sleeve in an unwinding direction; and separate releasable means for preventing rotation of the staff in an unwinding direction.

3. In a hand brake of the character described, the combination with a bracket adapted to be secured to the wall of a car or the like; of a sleeve rotatably mounted in and supported by said bracket and to which one end of a flexible connection is adapted to be attached and wound therearound; a staff rotatably mounted within said sleeve and in frictional contact therewith, said staff being adapted to have the opposite end of said flexible connection attached thereto and wound therearound; manually releasable means to prevent rotation of said sleeve in an unwinding direction; a ratchet wheel rigidly mounted on said staff; a carrier oscillatably mounted with respect to said staff; a pawl-carrying operating handle pivotally attached to the carrier and adapted to drop to a vertical inoperative position under the influence of gravity, the pawl thereof being arranged to coöperate with said ratchet wheel when the handle is elevated; a dog coöperable with said ratchet wheel and arranged to prevent rotation thereof and the staff in an unwinding direction.

4. In a hand brake for railway cars, the combination with a brake rod having a sheave wheel mounted thereon; of a bracket adapted to be secured to a wall of the car; a sleeve journaled in said bracket and supported therefrom; a staff mounted within said sleeve and rotatable with respect thereto, said staff and sleeve having frictional contact; a flexible connection passing over said sheave wheel and having one end thereof attached to said sleeve and the other end attached to the staff; means for directly effecting rotation of said staff in a direction to wind one end of the flexible connection therearound, said sleeve being indirectly rotated in the same direction by reason of the frictional contact with the staff until the tension on said flexible connection overbalances the friction; and independently acting means for preventing rotation of the sleeve and staff in an unwinding direction.

5. In a hand brake of the character described, the combination with a bracket; of a sleeve rotatably mounted in said bracket, said sleeve having an annular flange rigid with respect thereto; anti-friction bearings between said flange and the bracket sustaining the weight of the sleeve; a staff disposed within said sleeve and supported thereby, said sleeve and staff being arranged to each have one end of a common flexible connection attached thereto; means for rotating said staff indirectly therefrom; and independently acting means to prevent rotation of the sleeve and staff in an unwinding direction.

6. In a hand brake of the character described, the combination with a bracket adapted to be secured to a wall of a car; of a sleeve rotatably mounted within and supported from said bracket; a staff rotatably mounted within and supported from said sleeve; a ratchet wheel on said staff; an operating lever and pawl coöperable with said ratchet wheel to effect rotation of the staff in one direction; a dog coöperable with said ratchet wheel to prevent reverse rotation of said staff; a ratchet wheel rotatable in unison with said sleeve; and a dog coöperable with said sleeve and ratchet wheel to prevent reverse rotation of the sleeve, one of said dogs having a release handle and a shoulder coöperable with the other dog to thereby effect simultaneous disengagement of both dogs from their respective ratchet wheels.

7. In a hand brake of the character described, the combination with a bracket adapted to be secured to a wall of a car; a sleeve rotatably mounted within said bracket; an anti-friction bearing interposed between said sleeve and bracket and by which the weight of the sleeve is sustained; a ratchet wheel carried by said sleeve; a staff disposed within said sleeve, said staff having a ratchet wheel at its upper end supported on and rotatable with respect to the sleeve; a carrier oscillatable with respect to the last named ratchet wheel; a combined operating lever and pawl pivotally attached to the carrier and adapted to coöperate with the staff ratchet wheel to effect rotation thereof directly, the sleeve being indirectly rotated therefrom by reason of the friction therebetween where the staff is supported by the sleeve; a brake rod having a sheave wheel thereon; a flexible connection passing over said sheave wheel and having one end thereof attached to the sleeve and the other end thereof attached to the staff; and independently acting spring controlled dogs coöperable with said two ratchet wheels, the dog coöperable with the ratchet wheel of the sleeve having a release handle and means for effecting disengagement of the other dog upon release of the dog coöperable with the sleeve ratchet wheel.

In witness that I claim the foregoing I have hereunto subscribed my name.

JOHN F. O'CONNOR

Witness:
PAULINE M. MERRICK.